Figure 1:
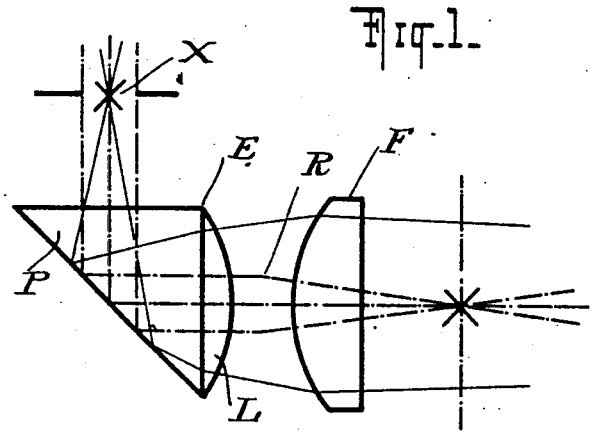

May 7, 1929.  C. W. KEUFFEL  1,712,112
EYEPIECE FOR OPTICAL INSTRUMENTS
Filed Dec. 14, 1925

INVENTOR
CARL W. KEUFFEL
BY
ATTORNEY

Patented May 7, 1929.

1,712,112

UNITED STATES PATENT OFFICE.

CARL W. KEUFFEL, OF WEEHAWKEN, NEW JERSEY, ASSIGNOR TO KEUFFEL & ESSER CO., OF HOBOKEN, NEW JERSEY, A CORPORATION OF NEW JERSEY.

EYEPIECE FOR OPTICAL INSTRUMENTS.

Application filed December 14, 1925. Serial No. 75,215.

This invention relates to optical instruments and has for its principal object to provide a new and improved construction of an optical eye-piece adapted for use in various types of optical instruments.

In the construction of certain types of optical instruments, in which a telescope is used, it is desirable for various reasons to make the telescope short and compact, but at the same time of a magnifying power relatively high for the length of the telescope. This necessarily involves the use of an eye-piece of short focal length. When a short focus eye-piece is used the eye-distance, viz, the distance of the exit pupil from the last optical surface is correspondingly short and consequently the eye of the observer must be placed very close to the eye-piece in order that a view of the full field of the telescope may be obtained. Consequently it has been a difficult problem in the art to construct telescopes for certain kinds of optical instruments, as for example, expedition plane tables, which telescopes would have the desired compactness and magnification power, and which would give also satisfactory results with respect to convenience of observation, and view of the full field of the telescope.

Many different constructions have been proposed to solve this problem, among which may be noted, the use of a 45° optical prism placed between the eye-piece and exit pupil and spaced from said eye piece for reflecting the rays perpendicularly to the axis of the telescope, thus projecting the image to one side of the telescope. While this construction places the exit pupil in a more convenient location for certain types of instruments, it possesses the following disadvantages: The eye cannot be placed close enough to the exit pupil to obtain a view of the full field. The interposition of the additional reflecting surfaces of the prism results in the loss of much of the light by reflection as it passes from one media to another. This loss of light is moreover increased because of the necessity of silvering the inclined reflecting surface of the 45° prism in order to insure total reflection and as a result an additional portion of the light is absorbed by the silvered surface. An even greater objection in the use of the right angle prisms is due to the deterioration and consequent impermanency of the silvered reflecting surfaces.

Considered more specifically the present invention has for its object the construction of a new and improved optical eye-piece which will enable a telescope to be constructed of the desired compactness and magnification, that will be convenient for observation and enable a view of the full field to be obtained, that will be of longer eye-distance than those heretofore constructed and will avoid the objectionable loss of light due to reflection.

Figure 2:
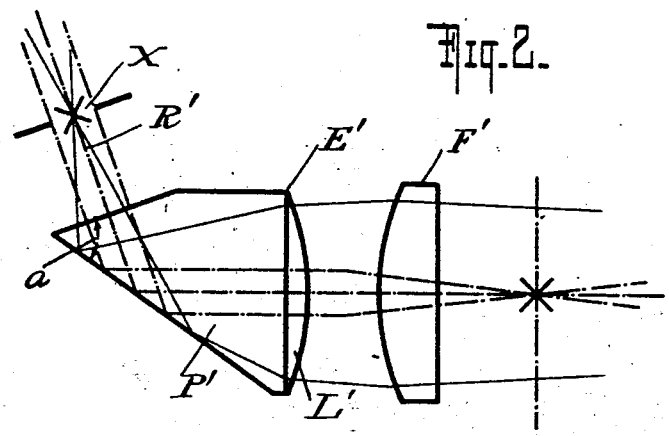

In the accompanying drawings, Fig. 1 is a diagrammatic side elevation of an eye-piece constructed in accordance with the principles of my invention, and Fig. 2 is a similar view of a slightly different, but preferred, construction.

As shown in Fig. 1 the reference letter F indicates the field lens of a short telescope adjacent to which is placed my improved eye-piece E. This eye-piece is constructed of a single piece of optical glass having the major portion thereof formed to provide a 45° prism P, the face of which, adjacent to the field lens F, is ground to provide an eye-lens L. The rays R which pass through the field lens are brought to a focus to produce a real image of the entrance pupil at the exit pupil X, said rays in passing through the 45° prism P being reflected at right angles to the optical axis of the telescope.

In the form of the invention shown in Fig. 2 the prism portion $P^1$ of the eye piece $E^1$ is ground so that the rays $R^1$ are reflected upwardly at a rearward inclination to the perpendicular, thus bringing the image at the exit pupil X at a more favorable position for observation. The lens portion $L^1$ of the prism eye piece $E'$ is similar to the lens L. The angle between the inclined surfaces of the prism and the lens may be varied from the particular angle shown, it being understood however that the angle $a$ should be greater than the critical angle of the glass employed so that total internal reflection will occur.

It will be seen that by making the reflecting prism and eye lens of a single piece of glass, I avoid the loss of light due to surface reflection such as occurs when the prism and lens are separate as in the prior art constructions. In addition, as the path of the rays between the eye lens and last optical surface is shortened, the eye distance is increased, thus enabling a view of the full field to be obtained. Furthermore, the angle of inclination, particularly with the construction shown in Fig. 2, is more convenient for sighting, and moreover, as total internal reflection for all field rays is secured in the preferred construction, it is unnecessary to silver the reflecting surface and consequently the objectionable deterioration of the optical member hereinbefore referred to is avoided.

I claim:

1. A telescopic system comprising a field lens and an eye-piece placed close together to provide a short compact structure, said eye-piece consisting of a single piece of optical glass formed to provide a reflecting prism, and an eye-lens upon that side of said prism nearest to said field lens, the reflecting surface of the prism being so inclined to the optical axis of the light rays that total reflection throughout the field results.

2. A prismatic eye-piece for an optical instrument, consisting of a single piece of optical glass having a light entering side and a reflecting side, the light entering side having a spherical convex surface, and the reflecting side being so inclined to the incident rays that it gives a total internal reflection, and a rearward inclination of the exit light rays, thereby affording a more convenient angle for sighting.

3. A prismatic eye-piece for an optical instrument consisting of a single piece of optical glass having the light entering side formed to provide an eye lens, and a reflecting side inclined to the incident rays falling upon the light entering side at an angle such that total internal reflection occurs and the reflected or exit rays are directed upwardly and rearwardly to afford a convenient sighting angle.

4. A prismatic eye-piece for an optical instrument consisting of a single piece of optical glass having the light entering side formed to provide an eye lens, a reflecting side inclined to the incident rays falling upon the light entering side at an angle such that total internal reflection occurs and the reflected or exit rays are directed upwardly and rearwardly to afford a convenient sighting angle, and a light exit side located in a plane normal to the exit light rays and inclined to the axis of the eye lens.

In testimony whereof I have hereunto set my hand.

CARL W. KEUFFEL.